US005492761A

United States Patent [19]

Shukushima

[11] Patent Number: 5,492,761

[45] Date of Patent: Feb. 20, 1996

[54] HEAT-RESISTANT COATED ELECTRICALLY CONDUCTIVE WIRE

[75] Inventor: Satoshi Shukushima, Osaka, Japan

[73] Assignee: Sumitomo Electric Industries, Ltd., Osaka, Japan

[21] Appl. No.: 280,672

[22] Filed: Jul. 27, 1994

Related U.S. Application Data

[63] Continuation of Ser. No. 942,334, Sep. 9, 1992, abandoned, which is a continuation of Ser. No. 520,139, May 8, 1990, abandoned, which is a continuation-in-part of Ser. No. 435,835, Nov. 14, 1989, abandoned.

[30] Foreign Application Priority Data

Jan. 27, 1989 [JP] Japan ..................................... 1-18600

[51] Int. Cl.[6] .............................. B32B 15/00; D02G 3/00

[52] U.S. Cl. .......................... 428/379; 428/375; 428/383; 174/110 A; 174/100 SR; 174/110 N

[58] Field of Search .................................... 428/379, 375, 428/395, 394, 378, 383; 174/110 A, 110 N, 110 SR

[56] References Cited

U.S. PATENT DOCUMENTS

| | | | |
|---|---|---|---|
| 3,373,226 | 3/1968 | Gowan | 174/110 SR |
| 4,521,485 | 6/1985 | Tondre et al. | 174/120 SR |
| 4,544,725 | 10/1985 | Priola | 525/467 |
| 4,726,993 | 2/1988 | Zaopo | 174/110 SR |
| 4,879,338 | 11/1989 | Mercer et al. | 524/508 |
| 5,178,726 | 1/1993 | Yu et al. | 156/643 |
| 5,286,550 | 2/1994 | Yu et al. | 428/212 |

FOREIGN PATENT DOCUMENTS

| | | | |
|---|---|---|---|
| 2638763 | 1/1978 | Germany | 174/110 SR |
| 47-25951 | 7/1972 | Japan | 174/120 SR |
| 2250209 | 10/1990 | Japan | 428/379 |
| WO8809041 | 11/1988 | WIPO | 174/120 SR |

*Primary Examiner*—Patrick J. Ryan
*Assistant Examiner*—J. M. Gray
*Attorney, Agent, or Firm*—Wenderoth, Lind & Ponack

[57] ABSTRACT

A heat-resistant coated electrically conductive wire, comprising an electrically conductive wire coated with an insulating coating. The insulating coating is obtained by forming a coating of a thermoplastic resin containing aromatic rings or complex rings on the electrically conductive wire, and then by subjecting the insulating coating to irradiation with an accelerated ion beam having an energy at least 0.1 MeV, thereby cross-linking the resin.

As the thermoplastic resins, polyetherimide, polysulfone, polyamide, polyallylate, polycarbonate, polyphenylene oxide, and the like can be used.

7 Claims, No Drawings

HEAT-RESISTANT COATED ELECTRICALLY CONDUCTIVE WIRE

This application is a continuation of now abandoned application, Ser. No. 07/942,334, filed Sep. 9, 1992, which is a continuation of now abandoned application, Ser. No. 07/520,139 filed on May 8, 1990, which was a continuation-in-part of now abandoned application Ser. No. 07/435,835 filed Nov. 14, 1989.

BACKGROUND OF THE INVENTION

1. Field of the Invention

The present invention relates to a heat-resistant coated electrically conductive wire such as an engineering plastic electric wire.

2. Prior Art

Although in general a cladding layer of an electric wire is formed of polyethylene resins and polyvinyl chloride resins, since these resins have low melting points of about 100° C., a disadvantage has occurred in that the insulating layer is melted and contracted when exposed to heat.

DESCRIPTION OF THE RELATED ART

In order to eliminate this disadvantage, in the case where the cladding layer is formed of polyethylene resins and polyvinyl chloride resins as shown, for example, in the publication of the examined Japanese Patent Application No. 55-23300, an electric wire has been clad with these resins and then cross-linked by the irradiation of electron beams and other chemical methods to form an insulating layer having an improved thermal deformability.

On the other hand, for an electric wire used in fields requiring a still higher heat resistance, a cladding layer of an electric wire has been formed of engineering plastics having a higher heat resistance, for example polyetheretherketone (PEEK), polyphenylene sulfide (PPS) and the like.

However, since the heat-resistant engineering plastics are generally aromatic polymers, they are not cross-linked even if they are irradiated with electron beams.

Accordingly, engineering plastic electric wires clad with engineering plastics can not be improved in thermal deformability by the irradiation of electron beams as electric wires clad with polyethylene resins and polyvinyl chloride resins.

In addition, a problem has occurred also in that the higher the heat-resistant temperature, the more expensive the engineering plastics, thus the material cost is high.

SUMMARY OF THE INVENTION

The present inventors have achieved the present invention as a result of the investigation aimed at improving the electric wire clad with the engineering plastics in thermal deformability in view of the above described matter.

That is to say, the present invention provides a heat-resistant coated electrically conductive wire having an improved thermal deformability by forming an insulating layer of thermoplastic resins including aromatic rings or complex rings in a molecule and cross-linking said insulating layer by irradiating it with ion beams by the use of ions having an energy larger than 0.1 MeV. The aromatic rings or complex rings of the thermoplastic resin molecules can be, for example, phenyl or imide groups.

Even though the polymers including aromatic rings or complex rings in a molecule are irradiated with electron beams, they are not cross-linked but they can be cross-linked when irradiated with ion beams.

It can be judged by a gel-fraction whether the cross-linking is brought about or not.

For example, even though polyetherimide is irradiated with electron beams in a dose of 72 Mrad, no gel is formed but when it is irradiated with ion beams by the use of $He^+$ ions of 1 MeV in a dose of $1\times10^{14}/cm^2$, the gel-fraction reached 70%.

The reason why polymers including aromatic rings or complex rings in a molecule, which are not cross-linked by irradiating with electron beams, are cross-linked by irradiating with ion beams is that the energy given to a unit volume by irradiating with ion beams is remarkably larger (several thousand times) than that by irradiating with electron beams, so that a ring-opening, which is not produced by irradiating with electron beams, is produced by irradiating with ion beams.

And, the cross-linking leads to the formation of a net-structure, in which molecules are arranged three-dimensionally, so that the thermal deformability is improved.

DESCRIPTION OF THE PREFERRED EMBODIMENTS

Although $H^+$, $He^+$, $N^+$, $Ar^+$ and the like can be used for ion beams to be irradiated, they are not limited by these kinds of ion. Since the smaller the mass of ions to be irradiated, the longer the penetrating distance of ion beams is, so that ions having the smaller mass are suitable for irradiating an electric wire provided with an insulating layer having a large wall-thickness therewith.

Since if the energy of the ion beams is smaller than 0.1 MeV, ions are stopped on the surface, so that the coating layer can not be cross-linked until an inside thereof, the thermal deformability can not be improved while if it is larger than 50 MeV, the coating layer is deteriorated by the ion beams to lower the mechanical strength of the electric wire, so that the energy larger than 50 MeV is undesired. Thus, a range from 0.1 MeV to 50 MeV is suitable.

The dose of the ion beams to be irradiated of $1\times10^{11}/cm^2$ to $1\times10^{15}/cm^2$ (preferably $1\times10^{12}/cm^2$ to $5\times10^{14}/cm^2$) is suitable.

It is the reason of this that if the dose is smaller than $1\times10^{11}/cm^2$, the cross-linking is not brought about, and the improvement of the heat resistance can not be achieved, while if it is larger than $1\times10^{15}/cm^2$, the deterioration of the coating layer progresses and the strength is lowered.

In the case of the insulating layer using polymers, of which elongation is reduced by irradiating them with ion beams, the heat resistance can be improved without lowering the mechanical strength by giving the heat resistance to the only surface and maintaining in non-irradiating portion the elongation using shorter range ion beam than the thickness of the insulating layer.

For example, polyamide, polyetherimide, polyallylate, polycarbonate, polyphenylene oxide, polyethersulfone, polyetheretherketone, polyphenylene sulfide and polysulfone can be used as the thermoplastic resins, which contain aromatic rings or complex rings in the molecule thereof.

A PREFERRED EMBODIMENT

An electric wire coated with polyallylate resins at a thickness of 50 μm as the insulating coating layer was irradiated with $He^+$ ions of 3 MeV in a dose of $1\times10^{14}/cm^2$.

Subsequently, it was confirmed that the gel-fraction measured by dimethylformamide (DMF) was 65% and the cross-linking was brought about by the irradiation of ion beams.

In addition, this electric wire was immersed in solder at 310° C. for 5 seconds with no change in shape.

On the other hand, a polyallylate-clad electric wire which has not been irradiated with ion beams, was similarly immersed in the solder with the results that the coating layer was melted and the coating of the electric wire was contracted.

EFFECTS OF THE INVENTION

As above described, if the thermoplastic resins include aromatic rings or complex rings therein and are irradiated with ion beams, said resins are cross-linked to improve the heat resistance and the thermal deformability, and the heat-resisting cross-linked electric wire coated with the insulating layer formed of such resins superior in thermal deformability can be obtained by the use of comparatively inexpensive resins.

What is claimed is:

1. A heat-resistant coated electrically conductive wire comprising an electrically conductive wire coated with a cross-linked resin insulating coating, wherein said cross-linked resin insulating coating consists of one thermoplastic resin containing aromatic rings or complex rings, which resin is not cross-linkable alone by electron beams, or wherein said cross-linked resin insulating coating consists of a plurality of thermoplastic resins containing aromatic rings or complex rings, which resins are not cross-linkable alone by electron beams, wherein said one thermoplastic resin or plurality of resins is selected from the group consisting of polyetheretherketone, polyamide, polyetherimide, polyallylate, polycarbonate and polysulfone, and wherein said thermoplastic resin or plurality of resins is cross-linked by a process which consists essentially of forming a coating of said thermoplastic resin or plurality of resins on said electrically conductive wire, and then subjecting said coating to irradiation with an accelerated ion beam having an energy of 0.1 to 50 MeV and having a dose in a range of $1\times10^{11}$ ions/cm$^2$ to $1\times10^{-15}$ ions/cm$^2$.

2. The heat-resistant coated electrically conductive wire according to claim 1, wherein said one thermoplastic resin is polyetheretherketone.

3. The heat-resistant coated electrically conductive wire according to claim 1, wherein said one thermoplastic resin is polyamide.

4. The heat-resistant coated electrically conductive wire according to claim 1, wherein said one thermoplastic resin is polyetherimide.

5. The heat-resistant coated electrically conductive wire according to claim 1, wherein said one thermoplastic resin is polyallylate.

6. The heat-resistant coated electrically conductive wire according to claim 1, wherein said one thermoplastic resin is polycarbonate.

7. The heat-resistant coated electrically conductive wire according to claim 1, wherein said one thermoplastic resin is polysulfone.

* * * * *